United States Patent
Fukazu

(10) Patent No.: US 12,319,426 B2
(45) Date of Patent: Jun. 3, 2025

(54) AIRCRAFT PROPULSION SYSTEM COMPRISING A COOLING SYSTEM

(71) Applicant: HONDA MOTOR CO., LTD., Tokyo (JP)

(72) Inventor: Tomohiro Fukazu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 203 days.

(21) Appl. No.: 18/079,906

(22) Filed: Dec. 13, 2022

(65) Prior Publication Data
US 2023/0192310 A1    Jun. 22, 2023

(30) Foreign Application Priority Data

Dec. 17, 2021   (JP) .............................. JP2021-204693
Dec. 17, 2021   (JP) .............................. JP2021-204696

(51) Int. Cl.
*B64D 33/08*    (2006.01)
*B64C 11/44*    (2006.01)

(52) U.S. Cl.
CPC .............. *B64D 33/08* (2013.01); *B64C 11/44* (2013.01)

(58) Field of Classification Search
CPC .......... B64D 33/00; B64D 33/08; B64C 11/44
USPC ...................................................... 244/53 R
See application file for complete search history.

(56) References Cited

U.S. PATENT DOCUMENTS

| | | | |
|---|---|---|---|
| 2020/0244139 A1 | 7/2020 | Vermeulen | |
| 2021/0104935 A1* | 4/2021 | Morrison | B64D 37/30 |
| 2021/0153394 A1* | 5/2021 | Mitic | H01L 23/3672 |
| 2021/0317835 A1* | 10/2021 | Sawata | H02K 9/00 |
| 2022/0119121 A1* | 4/2022 | Lacaux | H02K 7/116 |
| 2022/0239199 A1* | 7/2022 | Salam | B64D 33/08 |

FOREIGN PATENT DOCUMENTS

| | | |
|---|---|---|
| CN | 214690219 | 11/2021 |
| JP | 2013-184645 | 9/2013 |

OTHER PUBLICATIONS

Japanese Office Action for Japanese Patent Application No. 2021-204696 dated Apr. 23, 2024.

* cited by examiner

*Primary Examiner* — Brady W Frazier
(74) *Attorney, Agent, or Firm* — Amin, Turocy & Watson, LLP

(57) ABSTRACT

A cooling system includes: a heat sink located radially outward of a motor and including a plurality of fins; a motor cooling channel located between a stator of the motor and the plurality of fins and allowing a coolant to flow therethrough; an inverter cooling channel for cooling an inverter device by allowing the coolant to flow therethrough; a first flow channel allowing the coolant to flow from the motor cooling channel to the inverter cooling channel; a second flow channel allowing the coolant to flow from the inverter cooling channel to the motor cooling channel; and a pump provided in one of the first flow channel or the second flow channel.

6 Claims, 10 Drawing Sheets

FIG. 4
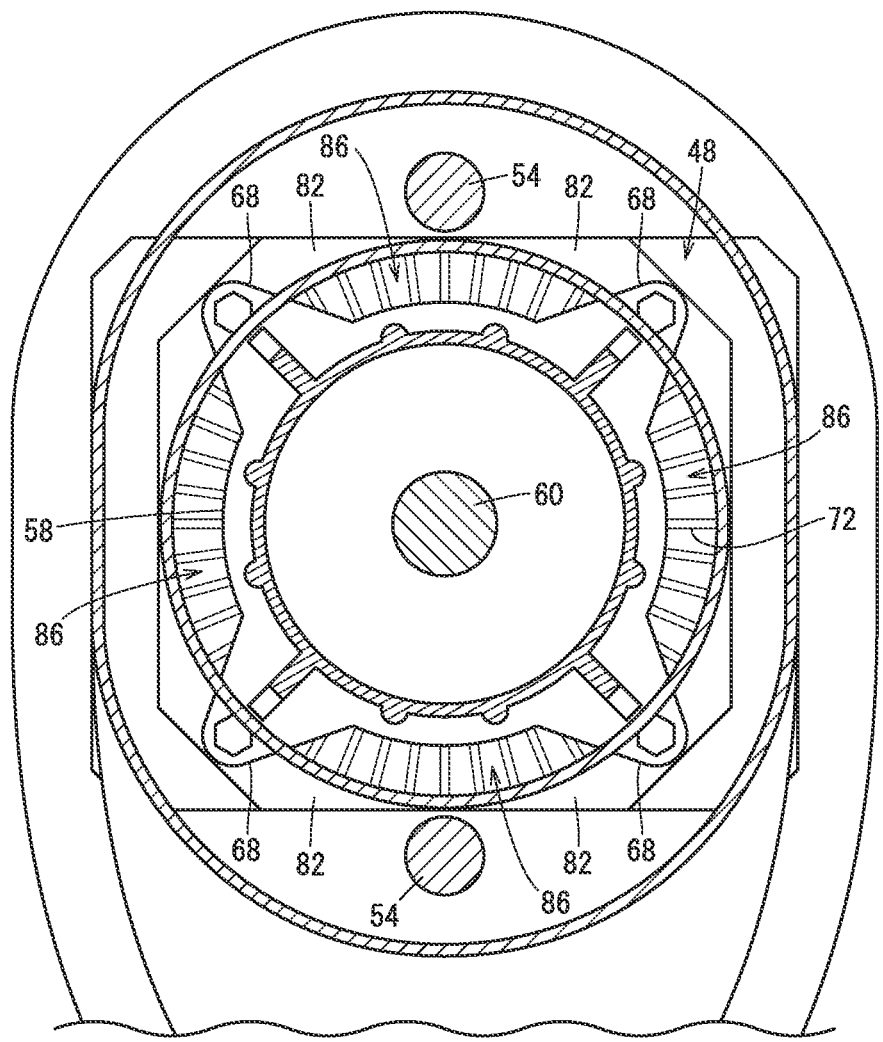
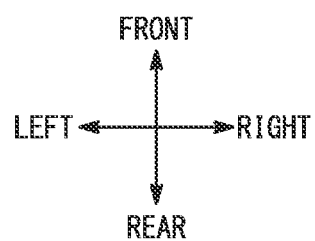

AIRCRAFT PROPULSION SYSTEM COMPRISING A COOLING SYSTEM

CROSS-REFERENCE TO RELATED APPLICATIONS

This application is based upon and claims the benefit of priority from Japanese Patent Applications No. 2021-204693 filed on Dec. 17, 2021 and No. 2021-204696 filed on Dec. 17, 2021, the contents all of which are incorporated herein by reference.

BACKGROUND OF THE INVENTION

Field of the Invention

The present invention relates to a cooling system that cools a motor for rotating a propeller of an electric aircraft, and an inverter device for controlling the operation of the motor, and further relates to a motor mount and a propeller device.

Description Of The Related Art

In recent years, electric aircraft have been actively developed. Examples of such aircraft include, for example, electric vertical take-off and landing aircraft. The electric vertical take-off and landing aircraft is referred to as an eVTOL. The electric aircraft includes a plurality of propeller devices. The propeller devices each include a propeller and an electric motor. In this specification, the electric motor is also simply referred to as a motor. The motor rotates the propeller.

US 2020/0244139 A1 discloses a technique for cooling a motor of an electric aircraft (multicopter). In this technique, a plurality of fins are formed on the outer peripheral surface of the motor. Further, a fan wheel is provided outside the motor. The fan wheel is connected to a rotating shaft of the motor. In this structure, the heat of the motor propagates to each fin. As the motor rotates, the fan wheel rotates. Then, cooling air flows between adjacent fins. As a result, each fin is cooled by the cooling air.

SUMMARY OF THE INVENTION

The motor of the electric aircraft is connected to an inverter. The number of inverters is equal to the number of motors. In the same manner as the motors, the inverters generate heat. Therefore, it is necessary to cool each inverter as well as each motor.

In order to cool the inverter, a cooling device such as a radiator may be provided in the electric aircraft. However, when the radiator is provided in the electric aircraft, the electric aircraft becomes heavy. Then, power consumption per unit flight distance of the electric aircraft increases. In other words, the range of the electric aircraft is shortened. Therefore, a technique for cooling each inverter while suppressing an increase in the weight of the electric aircraft as much as possible is demanded.

An object of the present invention is to solve the above-mentioned problem.

According to a first aspect of the present invention, there is provided a cooling system that cools a motor configured to rotate a propeller of an electric aircraft, and an inverter device configured to control an operation of the motor, the cooling system comprising: a heat sink located radially outward of the motor, and including a plurality of fins; a motor cooling channel located between a stator of the motor and the plurality of fins, and configured to allow a coolant to flow therethrough; an inverter cooling channel configured to cool the inverter device by allowing the coolant to flow therethrough; a first flow channel configured to allow the coolant to flow from the motor cooling channel to the inverter cooling channel; a second flow channel configured to allow the coolant to flow from the inverter cooling channel to the motor cooling channel; and a pump provided in one of the first flow channel or the second flow channel, wherein the coolant flows from the motor cooling channel through the first flow channel, the inverter cooling channel, and the second flow channel in this order and returns to the motor cooling channel, absorbs heat from each of the motor and the inverter device, and dissipates the heat to the fins.

According to a second aspect of the present invention, there is provided a motor mount that fixes a motor configured to rotate a propeller to an electric aircraft, the motor mount comprising: a mount cylindrical portion that extends in an axial direction of the motor, surrounds the motor, and is configured to guide cooling air for cooling the motor to a periphery of the motor; and a mount support portion located at one end of the mount cylindrical portion in the axial direction of the motor, and configured to support the motor.

According to a third aspect of the present invention, there is provided a propeller device including a motor configured to rotate a propeller of an electric aircraft, the propeller device comprising: a motor mount that extends in an axial direction of the motor, surrounds the motor, and is configured to fix the motor to the electric aircraft; and a housing portion penetrating in an up-down direction and configured to house the motor mount and the motor, wherein the housing portion and the motor mount guide cooling air for cooling the motor to a periphery of the motor.

According to the present invention, it is possible to cool the motor and the inverter device with a simple and lightweight configuration.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 4 is a cross-sectional view of the propeller device shown in FIG. 3 taken along line IV-IV.

DETAILED DESCRIPTION OF THE INVENTION

1. Overall Configuration of Electric Aircraft 10

Figure 1:
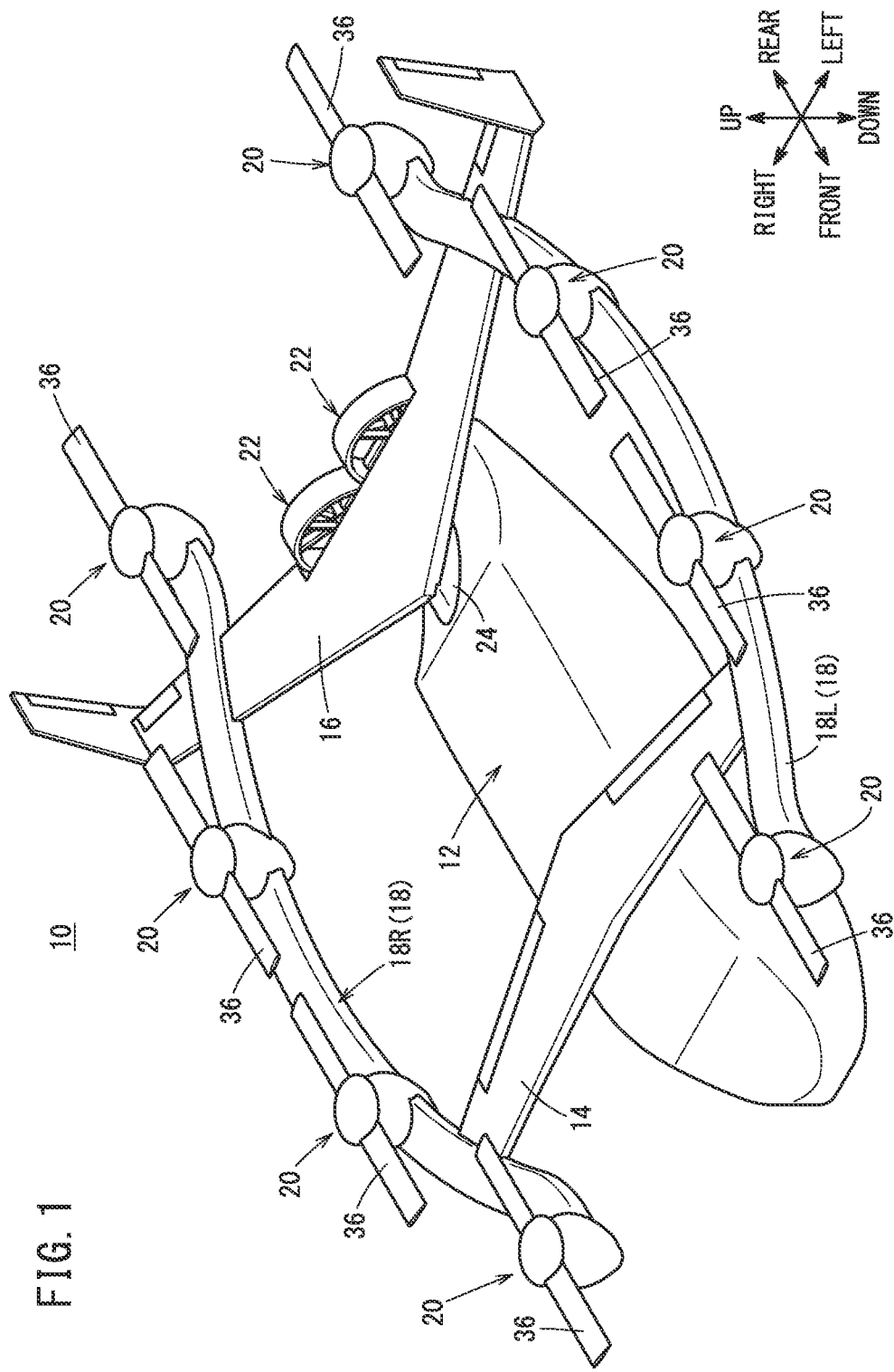
FIG. 1 is a perspective view of an electric aircraft.

The overall configuration of an electric aircraft 10 will be described with reference to FIG. 1. FIG. 1 is a perspective view of the electric aircraft 10. The electric aircraft 10 of the present embodiment is an eVTOL aircraft. However, the invention can also be used in multicopters. In the present specification, the electric aircraft 10 may also be referred to simply as the aircraft 10.

The aircraft 10 includes a fuselage 12, a front wing 14, a rear wing 16, two booms 18, a plurality of takeoff and landing propeller devices 20, and a plurality of cruise propeller devices 22. The fuselage 12 is long in the front-rear direction. The front wing 14 is disposed forward of an intermediate portion of the fuselage 12 in the front-rear direction. The front wing 14 is connected to an upper portion of the fuselage 12. The rear wing 16 is disposed rearward of the intermediate portion of the fuselage 12 in the front-rear direction. The rear wing 16 is connected to the fuselage 12 via a pylon 24.

The two booms 18 include a right boom 18R and a left boom 18L. Each boom 18 extends in the front-rear direction. The right boom 18R is disposed on the right side of the fuselage 12. The right boom 18R is curved rightward in an arc shape. The right boom 18R is connected to the right wing tip of the front wing 14 and connected to the right wing of the rear wing 16. The left boom 18L is disposed on the left side of the fuselage 12. The left boom 18L is curved leftward in an arc shape. The left boom 18L is connected to the left wing tip of the front wing 14 and connected to the left wing of the rear wing 16. Note that each boom 18 may have a straight shape.

Each boom 18 includes the plurality of propeller devices 20. In the present embodiment, each boom 18 includes four propeller devices 20. Note that each boom 18 may include two, three, five, or more propeller devices 20. In each boom 18, the four propeller devices 20 are sequentially arranged along the extending direction of the boom 18.

The fuselage 12 includes the plurality of propeller devices 22. In the present embodiment, the fuselage 12 includes two propeller devices 22. The fuselage 12 may include one or three or more propeller devices 22. The two propeller devices 22 are arranged side by side in the left-right direction at the rear end portion of the fuselage 12.

2. Structure of Propeller Device 20

Figure 2:
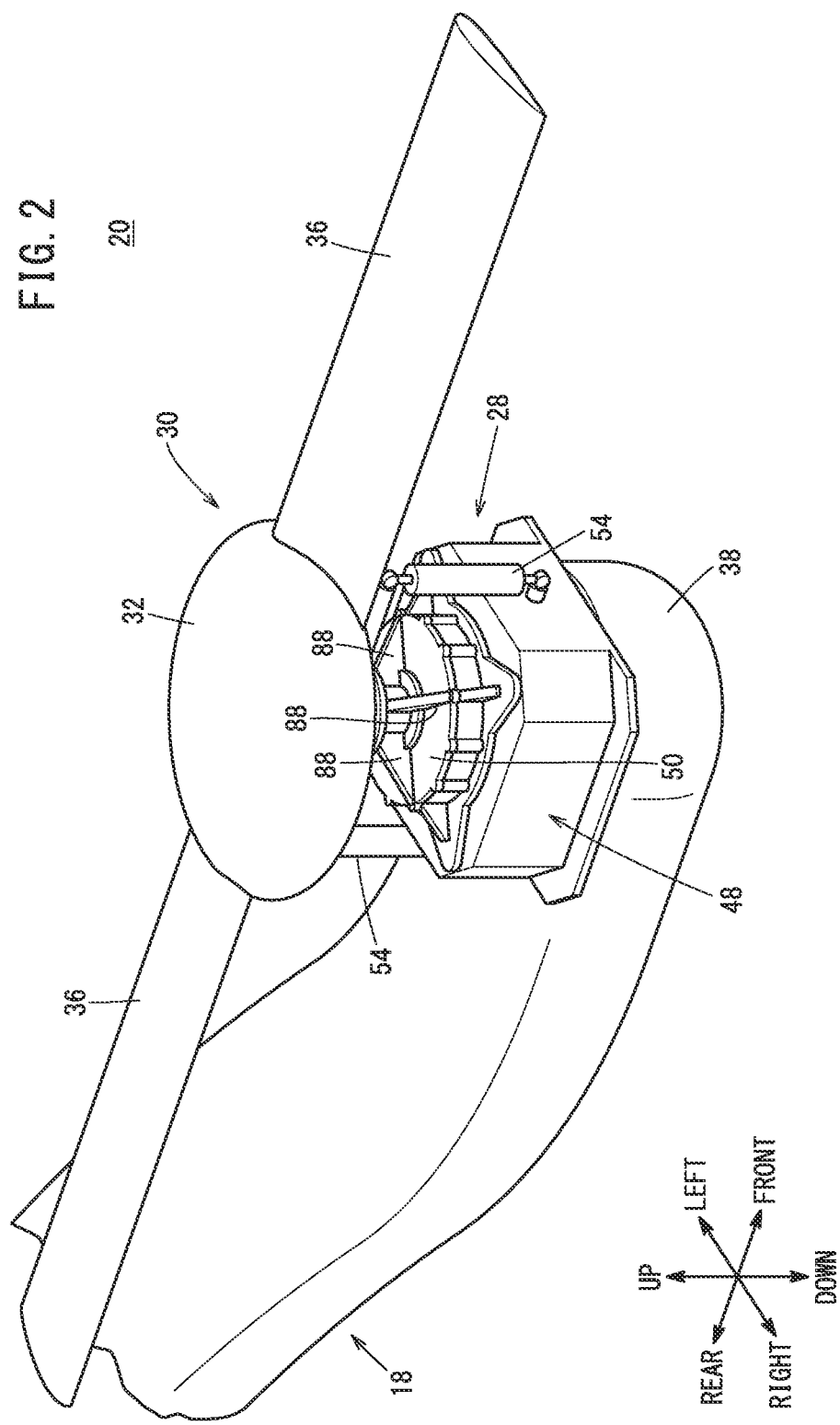
FIG. 2 is a perspective view of a propeller device without a fairing.
Figure 3:
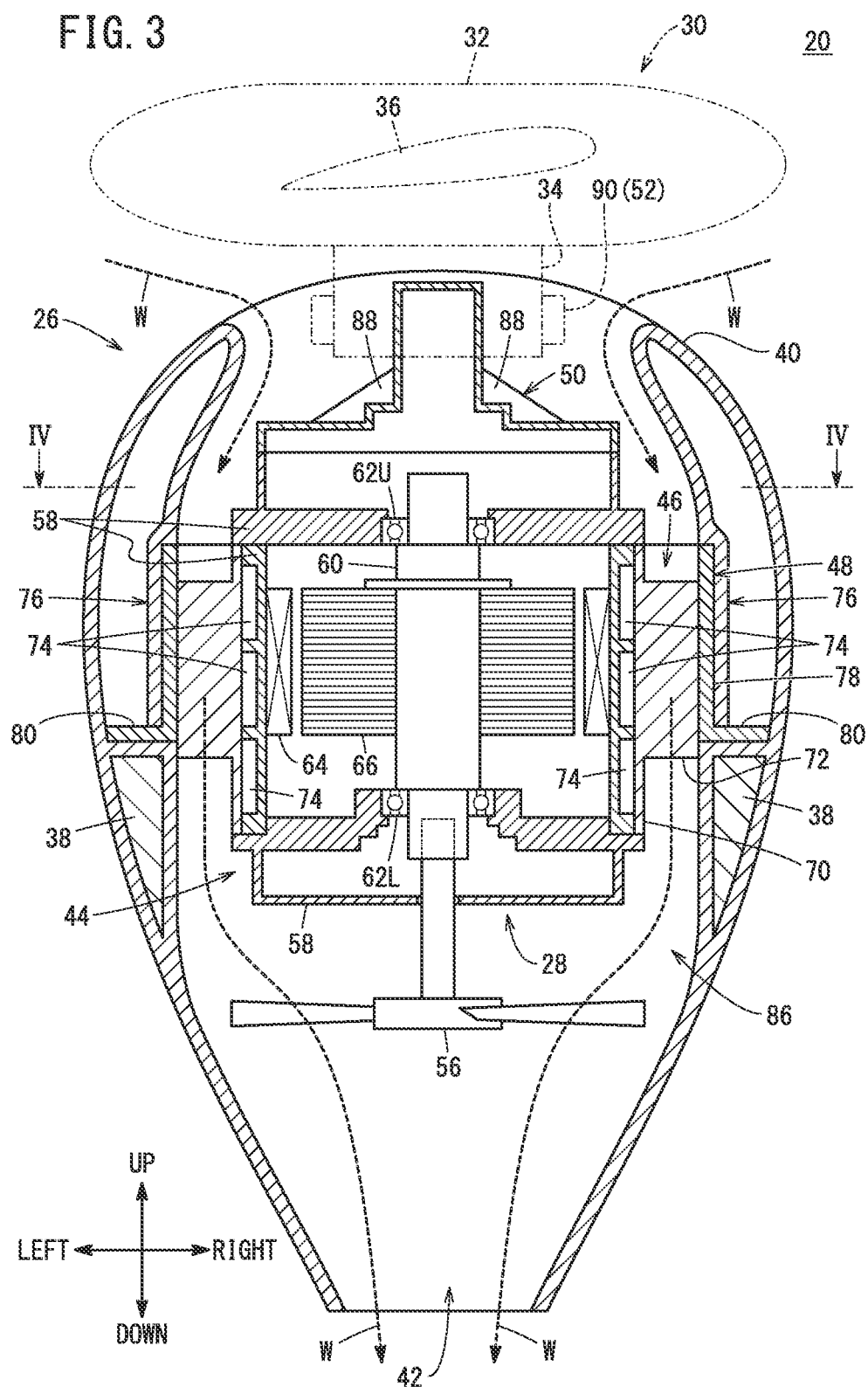
FIG. 3 is a cross-sectional view of the propeller device.
Figure 5:
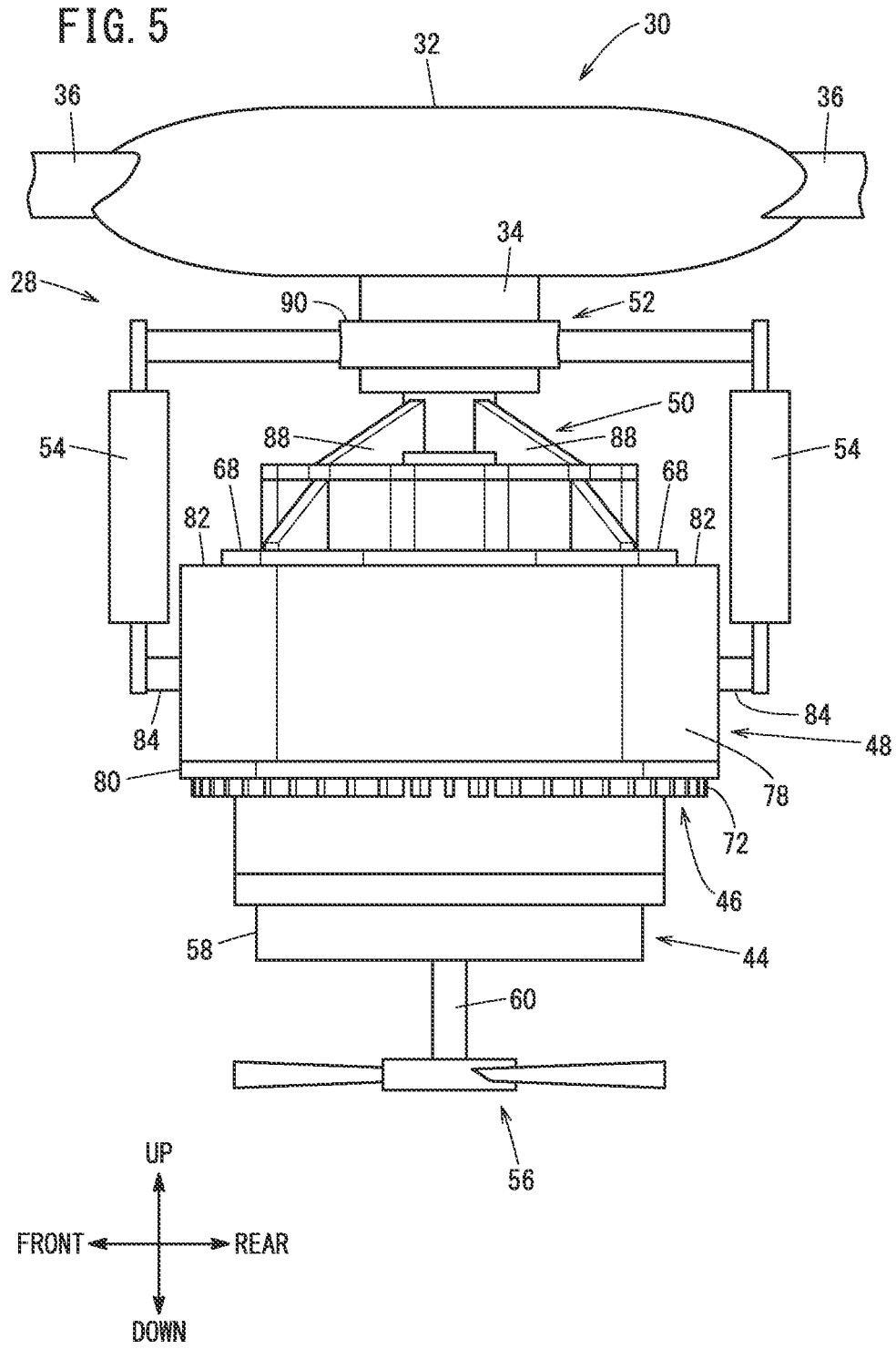
FIG. 5 is a side view of a drive unit and a propeller.
Figure 6:
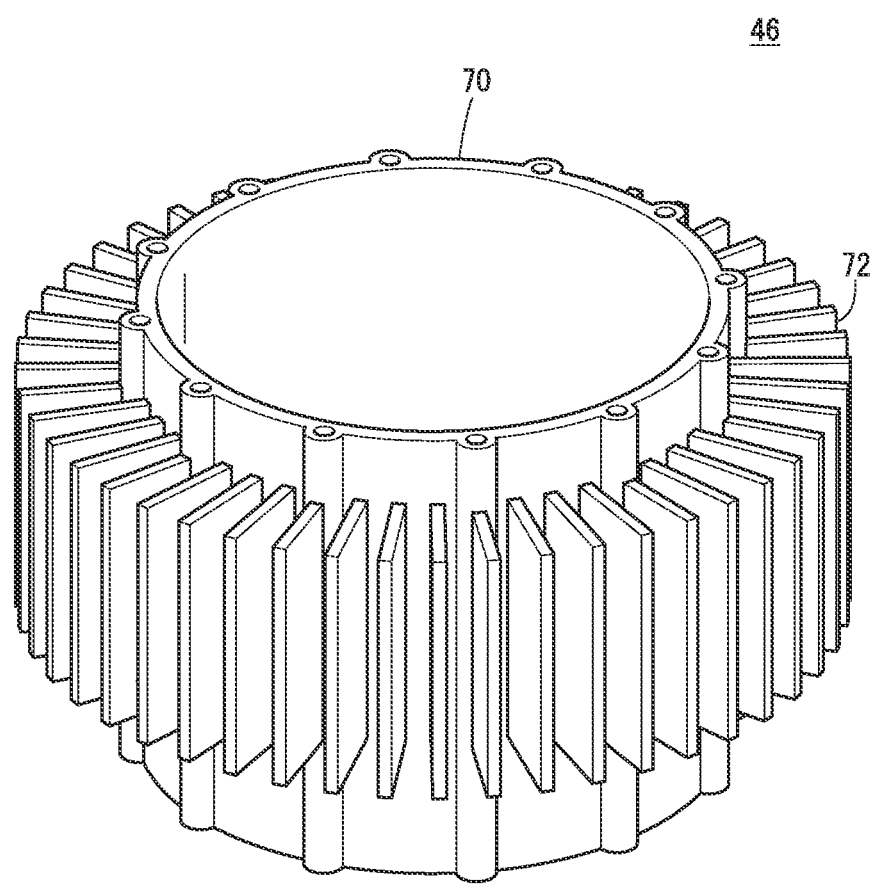
FIG. 6 is a perspective view of a heat sink.

The takeoff and landing propeller device 20 provided in the aircraft 10 will be described with reference to FIGS. 2 to 6. FIG. 2 is a perspective view of the propeller device 20 without a fairing 40. FIG. 3 is a cross-sectional view of the propeller device 20. FIG. 3 is a cross-sectional view orthogonal to the extending direction of the boom 18 and including the axis of a motor 44. FIG. 4 is a cross-sectional view of the propeller device 20 shown in FIG. 3 taken along line IV-IV. FIG. 4 is a cross-sectional view of the propeller device 20 disposed at the forefront of the left boom 18L. The cross-sectional structure of the other propeller devices 20 is basically the same as the cross-sectional structure shown in FIG. 4. FIG. 5 is a side view of a drive unit 28 and a propeller 30. FIG. 6 is a perspective view of a heat sink 46.

As shown in FIG. 3, the propeller device 20 includes a housing portion 26, the drive unit 28, and the propeller 30. In the rotorcraft, the "propeller" is also referred to as a "rotor". However, the term "propeller" is used herein to avoid confusion between the "rotor" and a rotor 66 of the motor 44. The propeller 30 includes a hub 32, a propeller rotating shaft 34, and a plurality of blades 36.

The housing portion 26 includes a frame 38 and the fairing 40. The frame 38 is a framework of the boom 18. The frame 38 is a component that supports the drive unit 28, an inverter device 96 (FIG. 7), and the like. The frame 38 is connected to the front wing 14 and the rear wing 16. The fairing 40 is a component that covers the frame 38. The fairing 40 has a hole 42 formed therethrough in the up-down direction. The housing portion 26 houses the drive unit 28 in the hole 42.

The drive unit 28 includes the motor 44, the heat sink 46, a motor mount 48, a gear box 50, a variable pitch mechanism 52, two actuators 54, and a fan 56. The axes of the respective components are aligned. Note that three or more actuators 54 may be provided.

Figure 7:
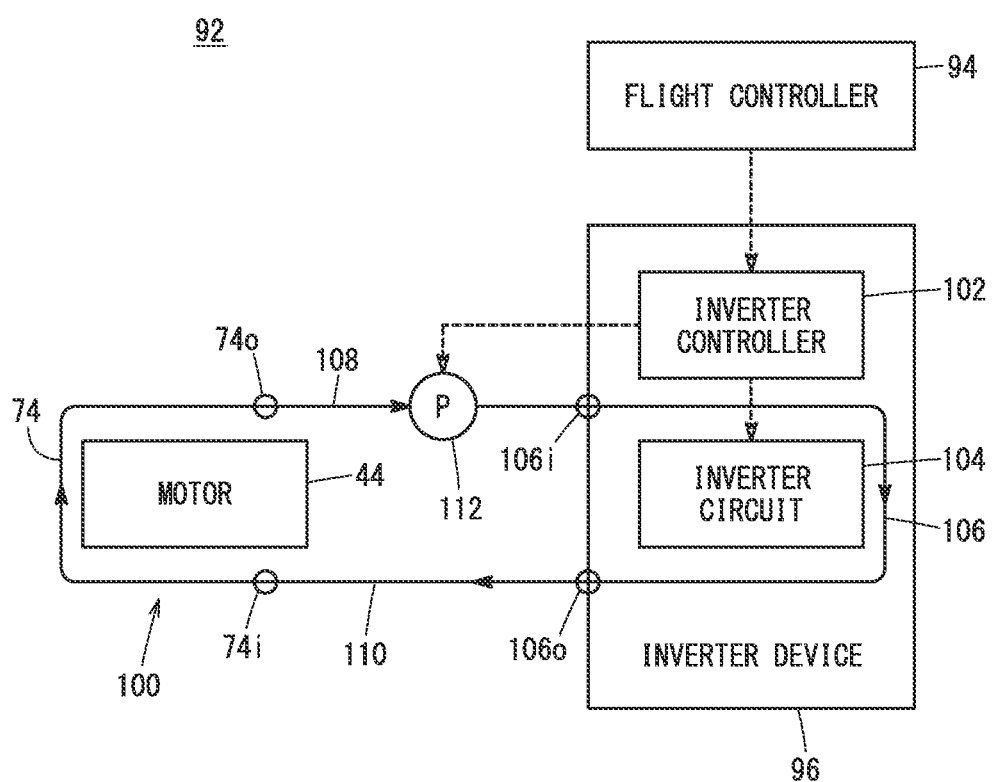
FIG. 7 is a block diagram of a cooling system.

The motor 44 is an AC motor. As shown in FIG. 3, the motor 44 includes a motor housing 58, a motor rotating shaft 60, two bearings 62U and 62L, a stator 64, and the rotor 66. The motor housing 58 is formed by combining a plurality of members. The motor housing 58 houses a part of the motor rotating shaft 60, the stator 64, and the rotor 66. The bearing 62U is fixed to the upper end portion of the motor housing 58. The bearing 62L is fixed to the lower end portion of the motor housing 58. The two bearings 62U and 62L rotatably support the motor rotating shaft 60. The motor rotating shaft 60 is fixed to the rotor 66. The stator 64 is located radially outward of the rotor 66. A coil (not shown) of each phase is disposed in the stator 64. AC power is supplied to the coil of each phase from a power supply via an inverter circuit 104 (FIG. 7).

As shown in FIG. 4, the motor housing 58 includes four motor fixing portions 68. The motor fixing portions 68 protrude radially outward from the outer periphery of the motor housing 58. The motor fixing portions 68 are located at a relatively upper portion in the motor housing 58. The motor fixing portions 68 are located at the same height in the up-down direction. The motor fixing portions 68 are arranged at equal intervals in the circumferential direction about the axis of the motor 44. For example, the motor fixing portions 68 are located above the stator 64 and the rotor 66. Each of the motor fixing portions 68 is fixed to a first support portion 82 of the motor mount 48 by bolts, welding, or the like. The number of the motor fixing portions 68 may be two. However, in order to stabilize the motor 44, the number of the motor fixing portions 68 is preferably three or more.

The heat sink 46 is located radially outward of the motor 44. As shown in FIG. 6, the heat sink 46 includes a heat sink cylindrical portion 70 and a plurality of fins 72. The heat sink cylindrical portion 70 is attached to the motor housing 58 so as to cover the outer peripheral surface of the motor housing 58. Each of the fins 72 extends from the heat sink cylindrical portion 70 to the radially outer side of the heat sink cylindrical portion 70, and extends in the axial direction of the heat sink cylindrical portion 70 (the axial direction of the motor 44). The plurality of fins 72 surround the heat sink cylindrical portion 70. A space extending in the axial direction of the heat sink cylindrical portion 70 is formed between two adjacent fins 72. It should be noted that the heat sink 46 and the motor housing 58 may be integrated with each other. For example, the motor housing 58 may include the plurality of fins 72.

As shown in FIG. 3, a motor cooling channel 74 is formed between the motor housing 58 and the heat sink cylindrical portion 70. The motor cooling channel 74 is formed along the outer peripheral surface of the motor 44 and the inner peripheral surface of the heat sink 46. The motor cooling channel 74 is divided into a plurality of sections arranged in the axial direction of the motor 44. However, the respective sections of the channel communicate with each other at a plurality of locations.

An inlet 74*i* (FIG. 7) and an outlet 74*o* (FIG. 7) of the motor cooling channel 74 are formed in the heat sink 46. A coolant flows through the motor cooling channel 74. The coolant flows into the motor cooling channel 74 from the inlet 74*i*, flows through the motor cooling channel 74, and flows out to the outside from the outlet 74*o*. The motor cooling channel 74 may be formed in the motor housing 58. Further, the motor cooling channel 74 may be formed in the heat sink cylindrical portion 70. In this manner, the motor cooling channel 74 may be disposed between the stator 64 and the plurality of fins 72.

The motor mount 48 is positioned around the heat sink 46 in a state of being separated from each of the fins 72. The motor mount 48 surrounds the motor 44 and the heat sink 46. The motor mount 48 is housed in the hole 42 of the fairing 40 together with the motor 44 and the heat sink 46. A mount arrangement portion 76 is formed in a part of the inner peripheral surface between the upper end portion and the lower end portion of the fairing 40 (the inner peripheral surface forming the hole 42). The motor mount 48 is arranged in the mount arrangement portion 76. The motor mount 48 includes a mount cylindrical portion 78, a mount fixing portion 80, the first support portion 82, and two second support portions 84 (FIG. 5).

The mount cylindrical portion 78 houses the motor 44 to which the heat sink 46 is attached. The mount cylindrical portion 78 surrounds the heat sink 46 and the motor 44 that are housed therein. The mount cylindrical portion 78 extends in the axial direction of the motor 44. The inner diameter of the mount cylindrical portion 78 is substantially equal to the inner diameter of the hole 42 of the fairing 40. Further, the axis of the mount cylindrical portion 78 is aligned with the axis of the hole 42. It is preferable that, in a state where the motor mount 48 is arranged in the mount arrangement portion 76, a level difference and a gap at a boundary between the inner peripheral surface of the mount cylindrical portion 78 and the inner peripheral surface of the fairing 40 be as small as possible.

The inner peripheral surface of the fairing 40 and the inner peripheral surface of the mount cylindrical portion 78 function as a duct 86 penetrating in the up-down direction. The motor 44 and the heat sink 46 are located inside the duct 86. As will be described in detail later, as the fan 56 rotates, cooling air flows through the duct 86. By reducing the level difference and the gap at the boundary between the inner peripheral surface of the mount cylindrical portion 78 and the inner peripheral surface of the fairing 40, the pressure loss of the cooling air flow can be reduced.

The mount fixing portion 80 fixes the motor mount 48 to the frame 38. For example, the mount fixing portion 80 is a flange extending in the left-right direction. The mount fixing portion 80 is fixed to the frame 38 of the boom 18 by bolts, welding, or the like. Note that the mount fixing portion 80 may not be a flange. For example, the mount fixing portion 80 may be a lower end portion of the mount cylindrical portion 78. In this case, the frame 38 may include a protruding portion that protrudes upward, and the mount fixing portion 80 (the lower end portion of the mount cylindrical portion 78) may be fitted to the protruding portion of the frame 38.

As shown in FIG. 5, the first support portion 82 supports each of the motor fixing portions 68 of the motor housing 58. For example, the first support portion 82 is located at the upper end portion of the mount cylindrical portion 78. Each of the two second support portions 84 supports the actuator 54. For example, the two second support portions 84 protrude from the outer peripheral portion of the mount cylindrical portion 78. The two second support portions 84 are disposed along the extending direction of the boom 18.

The upper end of the motor mount 48, that is, the first support portion 82 is located above the upper ends of the respective fins 72. Accordingly, the first support portion 82 can support the motor 44 without contacting the fins 72. On the other hand, the lower end of the motor mount 48 is located above the lower ends of the respective fins 72. However, the lower end of the motor mount 48 may be located below the lower ends of the respective fins 72. Further, the lower end of the motor mount 48 may be located at the same height as the lower ends of the respective fins 72.

The motor mount 48 functions as a fixing member for fixing the motor 44 to the frame 38. Further, the motor mount 48 also functions as the duct 86 for guiding cooling air to the periphery of the motor 44. More specifically, the motor mount 48 functions as the duct 86 for guiding cooling air to between two adjacent fins 72. Further, the motor mount 48 also functions as a support member for supporting the actuators 54. The motor mount 48 may be formed on the frame 38 of the boom 18. That is, the frame 38 may directly support the motor 44.

The gear box 50 is located above the motor 44. The gear box 50 includes a plurality of gears that couple the motor rotating shaft 60 of the motor 44 and the propeller rotating shaft 34 of the propeller 30. The plurality of gears reduce the rotational speed of the motor rotating shaft 60 and transmit the reduced rotational speed to the propeller rotating shaft 34. The gear box 50 may be integrated with the motor 44. For example, the plurality of gears may be provided inside the motor housing 58.

The gear box 50 rotatably supports the propeller rotating shaft 34. As shown in FIG. 5, a plurality of beam portions 88 are formed on the outside of the gear box 50. Each of the beam portions 88 extends in the axial direction of the propeller rotating shaft 34 and the radial direction of the propeller rotating shaft 34. In the present embodiment, the gear box 50 includes four beam portions 88. The beam portions 88 are arranged at equal intervals in the circumferential direction about the axis of the propeller rotating shaft 34.

The variable pitch mechanism 52 adjusts the pitch of the blades 36 of the propeller 30. The variable pitch mechanism 52 includes a moving member 90. The moving member 90 is movable up and down along the propeller rotating shaft 34. The moving member 90 is connected to a link mechanism (not shown). The link mechanism changes the pitch of each blade 36 in accordance with the movement of the moving member 90. As shown in FIG. 5, the moving member 90 extends in two directions, that is, radially outward of the propeller rotating shaft 34 with the propeller rotating shaft 34 as a center. Specifically, the moving member 90 extends along the extending direction of the boom 18. The first actuator 54 is connected to one end portion (front end portion) of the moving member 90. The second actuator 54 is connected to another end portion (rear end portion) of the moving member 90.

Each of the actuators 54 can expand and contract in the up-down direction. Each of the actuators 54 includes, for example, a ball screw. The upper end portion of the first actuator 54 is connected to the front end portion of the moving member 90. The lower end portion of the first actuator 54 is connected to the second support portion 84 disposed on the front side. The upper end portion of the second actuator 54 is connected to the rear end portion of the moving member 90. The lower end portion of the second actuator 54 is connected to the second support portion 84 disposed on the rear side. The two actuators 54 operate in unison. The two actuators 54 move the moving member 90 up and down.

The fan 56 is located below the motor 44. The fan 56 is connected to the motor rotating shaft 60. Therefore, when the motor rotating shaft 60 rotates, the fan 56 rotates. Basically, since the motor rotating shaft 60 rotates in a fixed direction, the fan 56 also rotates in a fixed direction. When the fan 56 rotates, cooling air flowing from up to down is generated in the duct 86.

3. Cooling System 92

Figure 8:
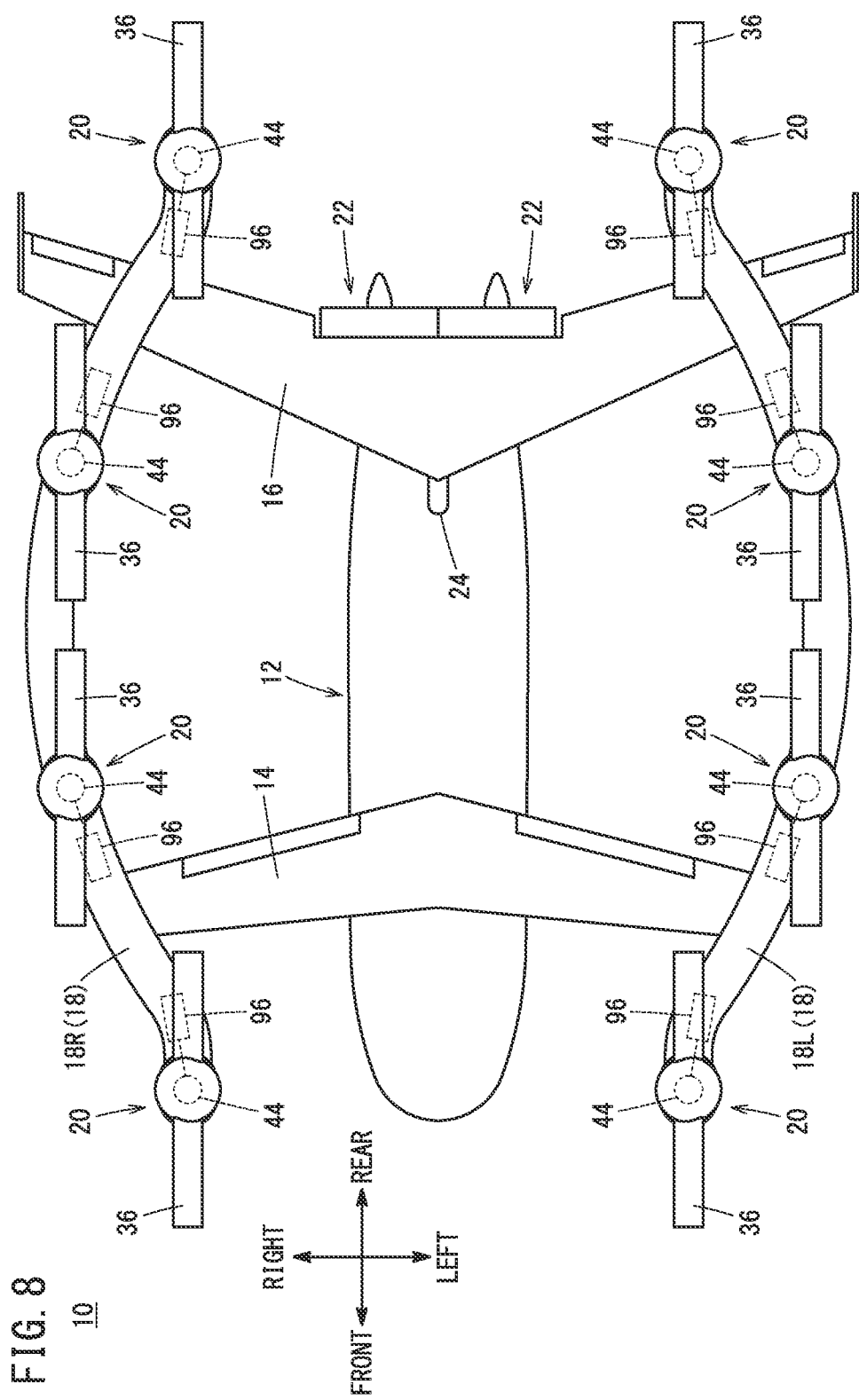
FIG. 8 is a layout diagram of a motor and an inverter device.

A cooling system 92 for cooling the motor 44 and the inverter circuit 104 will be described with reference to FIGS. 7 and 8. FIG. 7 is a block diagram of the cooling system 92. FIG. 8 is a layout diagram of the motor 44 and the inverter device 96.

Electric power is supplied to the motor 44 from a power supply via the inverter circuit 104. The motor 44 and the inverter circuit 104 generate heat. The aircraft 10 includes the cooling system 92 that cools the motor 44 and the inverter circuit 104. As shown in FIG. 7, the cooling system 92 includes a flight controller 94, the inverter device 96, the motor 44, and a cooling circuit 100.

The flight controller 94 includes a processor such as a CPU, and a memory. The flight controller 94 is disposed in the fuselage 12. The flight controller 94 comprehensively controls the aircraft 10. The flight controller 94 determines a control target and a control amount in accordance with the operation performed by the pilot, the state of the aircraft 10, and the like, and outputs an instruction signal to a controller of the control target. Further, the flight controller 94 controls the two actuators 54.

The inverter device 96 includes an inverter controller 102 and the inverter circuit 104. One inverter device 96 is provided for one motor 44. For example, as shown in FIG. 8, the inverter device 96 is disposed near the corresponding motor 44. Specifically, the inverter device 96 is disposed in the boom 18 together with the motor 44.

The inverter controller 102 includes a processor such as a CPU, and a memory. The inverter controller 102 controls the motor 44 corresponding to the inverter device 96. The inverter controller 102 outputs a control signal to the inverter circuit 104 in response to an instruction signal output from the flight controller 94. Further, the inverter controller 102 controls a pump 112 of the cooling circuit 100. The motor 44 is provided with a temperature sensor (not shown). The inverter circuit 104 is provided with a temperature sensor (not shown). For example, the inverter controller 102 acquires a temperature or the like detected by each temperature sensor. The inverter controller 102 calculates the flow rate of the pump 112 corresponding to each temperature, based on a map, an arithmetic expression, and the like stored in the memory. The inverter controller 102 controls the flow rate of the pump 112 so as to achieve the calculated rotational speed.

The inverter circuit 104 is, for example, a full-bridge inverter circuit having a plurality of phases. The inverter circuit 104 converts DC power supplied from the power supply into multi-phase AC power by a switching operation of a switching element (not shown), and supplies the AC power to the motor 44. The switching element is turned on and off in response to a control signal output from the inverter controller 102.

The cooling circuit 100 includes the motor cooling channel 74, an inverter cooling channel 106, a first flow channel 108, a second flow channel 110, and the pump 112. The cooling circuit 100 is a closed circuit that circulates a coolant.

As described with reference to FIG. 3, the motor cooling channel 74 is provided around the stator 64 of the motor 44. The outlet 74o of the motor cooling channel 74 communicates with the first flow channel 108. The inlet 74i of the motor cooling channel 74 communicates with the second flow channel 110. On the other hand, the inverter cooling channel 106 is provided around the inverter circuit 104. An inlet 106i of the inverter cooling channel 106 communicates with the first flow channel 108. An outlet 106o of the inverter cooling channel 106 communicates with the second flow channel 110.

The pump 112 is provided in the first flow channel 108. The pump 112 circulates the coolant inside the cooling circuit 100. For example, the coolant flows from the pump 112 through the inverter cooling channel 106, the second flow channel 110, the motor cooling channel 74, and the first flow channel 108 in this order, and returns to the pump 112.

4. Method for Cooling Motor 44 and Inverter Circuit 104

The inverter controller 102 outputs a control signal to the inverter circuit 104 to rotate the motor 44. When the motor 44 rotates, the propeller 30 rotates and the fan 56 rotates. Then, at the upper opening of the duct 86, outside air is sucked from the outside to the inside of the duct 86. The outside air serves as cooling air. In FIG. 3, the cooling air is indicated by arrow W. The cooling air flows downward inside the duct 86. The cooling air passes between two adjacent motor fixing portions 68 (FIG. 4) and flows into the motor mount 48. The cooling air flows downward along the heat sink 46 inside the motor mount 48. The cooling air cools the heat sink 46. At the lower opening of the duct 86, the cooling air is discharged from the inside to the outside of the duct 86.

The inverter controller 102 operates the pump 112. When the pump 112 is operated, the coolant circulates through the cooling circuit 100. The coolant absorbs heat from the motor 44 and the inverter circuit 104, and dissipates heat to the heat sink 46. The heat sink 46 is cooled by the cooling air. That is, the temperature of the coolant decreases in the motor cooling channel 74.

As described above, according to the present embodiment, the heat sink 46 provided for cooling the motor 44 has a function of cooling the inverter circuit 104.

5. Modification of Cooling System 92

Figure 9:
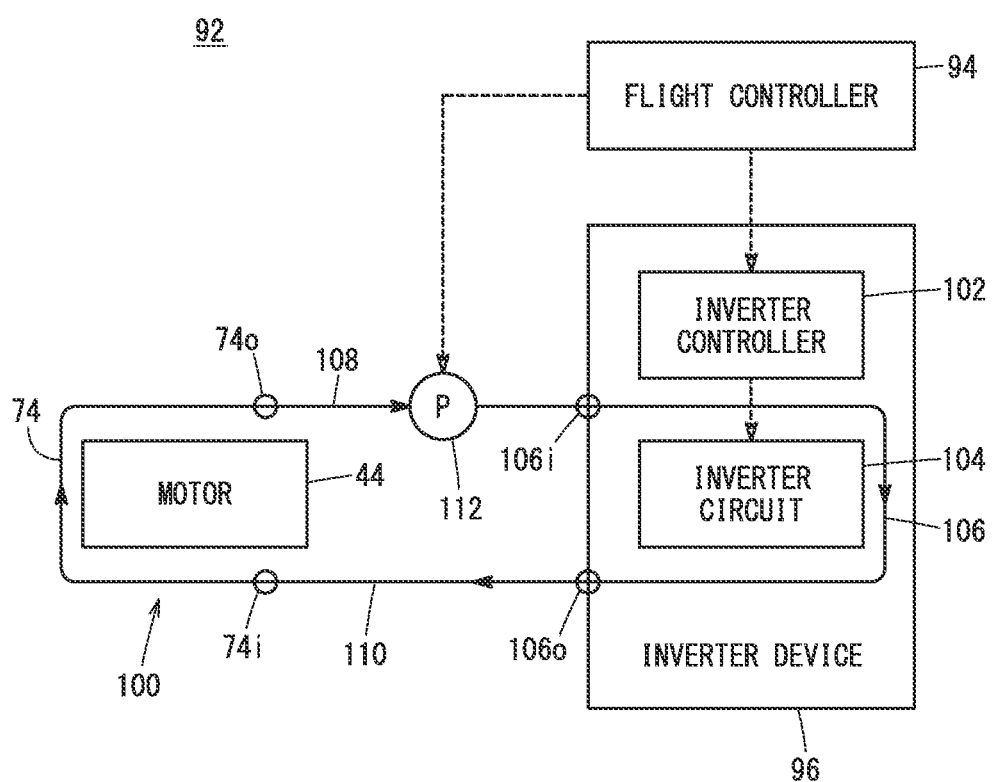
FIG. 9 is a block diagram of the cooling system according to a modification.

FIG. 9 is a block diagram of the cooling system 92 according to a modification. For example, the distance from the flight controller 94 to the pump 112 may be shorter than the distance from the inverter device 96 (inverter controller 102) to the pump 112. In such a case, the flight controller 94 may directly control the pump 112 as shown in FIG. 9.

6. Moment Acting on Propeller Device 20

Figure 10:
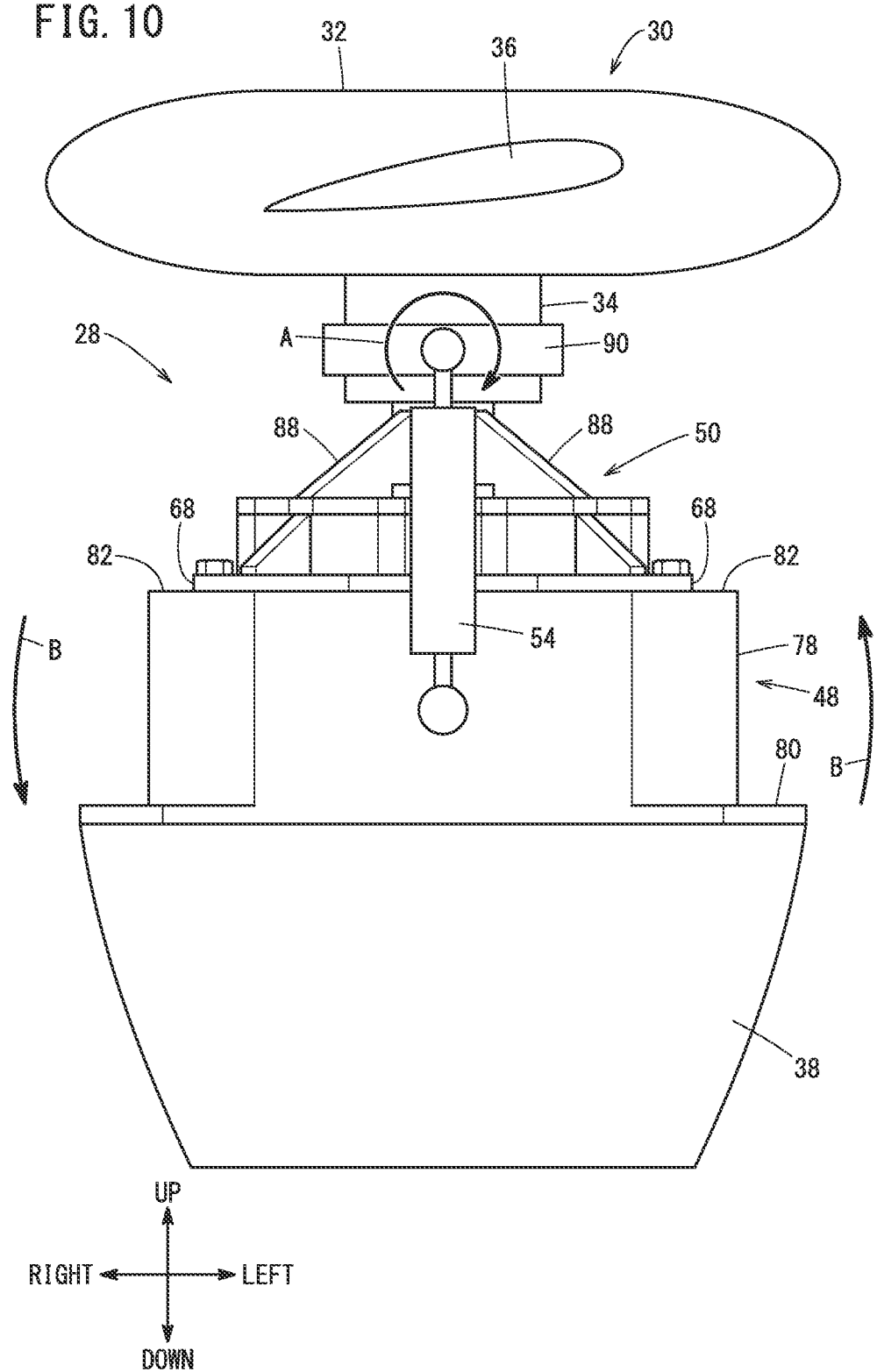
FIG. 10 is a front view of the propeller device without the fairing.

FIG. 10 is a front view of the propeller device 20 without the fairing 40. When the propeller 30 rotates, a moment about an axis parallel to the extending direction of the boom 18 is generated at the root portion of the propeller 30. In FIG. 10, the direction of the moment is indicated by arrow A. The moment acts on the plurality of beam portions 88 formed on the gear box 50. The force acting on the beam portions 88 is transmitted to the frame 38 via the motor mount 48.

On the other hand, a torsional reaction force is generated in the frame 38. In FIG. 10, the direction of the torsional reaction force is indicated by arrow B. In the frame 38, the force caused by the moment and the torsional reaction force are balanced. Therefore, the force acting on the boom 18 as the propeller 30 rotates is reduced.

7. Invention Obtained from Embodiment

The invention that can be grasped from the above embodiment will be described below.

The first aspect of the present invention is the cooling system (92) that cools the motor (44) configured to rotate the propeller (30) of the electric aircraft (10), and the inverter device (96) configured to control the operation of the motor, the cooling system including: the heat sink (46) located radially outward of the motor, and including the plurality of fins (72); the motor cooling channel (74) located between the stator (64) of the motor and the plurality of fins, and configured to allow the coolant to flow therethrough; the inverter cooling channel (106) configured to cool the inverter device by allowing the coolant to flow therethrough; the first flow channel (108) configured to allow the coolant to flow from the motor cooling channel to the inverter cooling channel; the second flow channel (110) configured to allow the coolant to flow from the inverter cooling channel to the motor cooling channel; and the pump (112) provided in one of the first flow channel or the second flow channel, wherein the coolant flows from the motor cooling channel through the first flow channel, the inverter cooling channel, and the second flow channel in this order and returns to the motor cooling channel, absorbs heat from each of the motor and the inverter device, and dissipates the heat to the fins.

In the above configuration, the heat sink for cooling the motor has a function of also cooling the inverter device. Therefore, the aircraft does not need to separately include a device for cooling the inverter device and a device for cooling the motor. Thus, according to the above configuration, it is possible to cool the motor and the inverter device with a simple and lightweight configuration.

In the first aspect, the inverter device may include the inverter circuit (104), and the inverter controller (102) configured to control the switching element of the inverter circuit, and the inverter controller may adjust the flow rate of the coolant by controlling the operation of the pump.

In the first aspect, the inverter device may include the inverter circuit, and the inverter controller configured to control the switching element of the inverter circuit, the electric aircraft may include the flight controller (94) configured to output the control signal to the inverter controller, and the flight controller may adjust the flow rate of the coolant by controlling the operation of the pump.

In the first aspect, the distance from the flight controller to the pump may be shorter than the distance from the inverter device to the pump.

According to the above configuration, the length of the signal line for outputting the instruction signal to the pump is shortened.

In the first aspect, the cooling system may further include the fan (56) configured to supply the cooling air to between two of the fins that are adjacent to each other.

According to the above configuration, it is possible to efficiently cool the motor.

In the first aspect of the present invention, the fan may be coupled to the motor rotating shaft (60) of the motor.

According to the above configuration, a separate motor for rotating the fan is not required.

The second aspect of the present invention is the motor mount (48) that fixes the motor (44) configured to rotate the propeller (30) to the electric aircraft (10), the motor mount including: the mount cylindrical portion (78) that extends in the axial direction of the motor, surrounds the motor, and is configured to guide cooling air for cooling the motor to the periphery of the motor; and the mount support portion (82) located at one end of the mount cylindrical portion in the axial direction of the motor and configured to support the motor.

According to the above configuration, the motor can be fixed to the electric aircraft. Further, according to the above configuration, it is possible to cause the cooling air to smoothly flow around the motor.

In the second aspect, the motor mount may further include the mount fixing portion (80) configured to fix the mount cylindrical portion to the electric aircraft.

The third aspect of the present invention is the propeller device (20) including the motor configured to rotate the propeller of the electric aircraft, the propeller device including: the motor mount that extends in the axial direction of the motor, surrounds the motor, and is configured to fix the motor to the electric aircraft; and the housing portion (26) penetrating in the up-down direction and configured to house the motor mount and the motor, wherein the housing portion and the motor mount guide cooling air for cooling the motor to the periphery of the motor.

According to the above configuration, the motor can be fixed to the electric aircraft. Further, according to the above configuration, it is possible to cause the cooling air to smoothly flow around the motor.

In the third aspect, the motor mount may include: the mount cylindrical portion that extends in the axial direction of the motor, surrounds the motor, and is configured to guide the cooling air to the periphery of the motor; and the mount support portion located at one end of the mount cylindrical portion in the axial direction of the motor, and configured to fix a plurality of portions of the motor.

In the third aspect, the plurality of fins (72) extending in the radial direction of the motor and in the axial direction of the motor may be located between the motor and the mount cylindrical portion, and, in the axial direction of the motor, the distance from the propeller to the mount support portion may be shorter than the distance from the propeller to each of the fins.

According to the above configuration, the motor mount can support the motor 44 without coming into contact with the fins.

In the third aspect, the electric aircraft may further include: the variable pitch mechanism (52) configured to change the pitch of each blade (36) of the propeller; and the actuator (54) configured to operate the variable pitch mechanism, and the motor mount may support the actuator.

In the third aspect, the propeller device may further include the support portion (50) that is connected to the motor mount and is configured to rotatably support the rotating shaft (34) of the propeller, and the plurality of beam portions (88) extending in the axial direction of the rotating shaft and in the radial direction of the rotating shaft may be formed on the outer peripheral portion of the support portion around the rotating shaft.

According to the above configuration, the force acting on the boom as the propeller rotates is reduced.

In the third aspect, the propeller device may further include the fan (56) configured to supply the cooling air to the housing portion and the motor mount.

According to the above configuration, it is possible to efficiently cool the motor.

In the third aspect, the fan may be coupled to the rotating shaft (60) of the motor.

According to the above configuration, a separate motor for rotating the fan is not required.

The present invention is not limited to the above disclosure, and various modifications are possible without departing from the essence and gist of the present invention.

What is claimed is:

1. An aircraft propulsion system comprising:
   a motor configured to rotate a propeller of an electric aircraft;
   an inverter device configured to control an operation of the motor;
   a heat sink located radially outward of the motor, and including a plurality of fins;
   a motor cooling channel located between a stator of the motor and the plurality of fins, and configured to allow a coolant to flow therethrough;
   an inverter cooling channel configured to cool the inverter device by allowing the coolant to flow therethrough;
   a first flow channel configured to allow the coolant to flow from the motor cooling channel to the inverter cooling channel;
   a second flow channel configured to allow the coolant to flow from the inverter cooling channel to the motor cooling channel; and
   a pump provided in one of the first flow channel or the second flow channel, wherein
   the coolant flows from the motor cooling channel through the first flow channel, the inverter cooling channel, and the second flow channel in this order and returns to the motor cooling channel, absorbs heat from each of the motor and the inverter device, and dissipates the heat to the fins.

2. The aircraft propulsion system according to claim 1, wherein
   the inverter device includes an inverter circuit, and an inverter controller configured to control a switching element of the inverter circuit, and
   the inverter controller adjusts a flow rate of the coolant by controlling an operation of the pump.

3. The aircraft propulsion system according to claim 1, wherein
   the inverter device includes an inverter circuit, and an inverter controller configured to control a switching element of the inverter circuit,
   the electric aircraft includes a flight controller configured to output a control signal to the inverter controller, and
   the flight controller adjusts a flow rate of the coolant by controlling an operation of the pump.

4. The aircraft propulsion system according to claim 3, wherein
   a distance from the flight controller to the pump is shorter than a distance from the inverter device to the pump.

5. The aircraft propulsion system according to claim 1, further comprising a fan configured to supply cooling air to between two of the fins that are adjacent to each other.

6. The aircraft propulsion system according to claim 5, wherein
   the fan is coupled to a rotating shaft of the motor.

\* \* \* \* \*